United States Patent
Sumner et al.

(10) Patent No.: US 9,733,790 B2
(45) Date of Patent: Aug. 15, 2017

(54) HAPTIC INTERFACE FOR POPULATION OF A THREE-DIMENSIONAL VIRTUAL ENVIRONMENT

(71) Applicant: Disney Enterprises, Inc., Burbank, CA (US)

(72) Inventors: Robert Sumner, Zurich (CH); Gioacchino Noris, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 206 days.

(21) Appl. No.: 14/528,969

(22) Filed: Oct. 30, 2014

(65) Prior Publication Data

US 2016/0124608 A1 May 5, 2016

(51) Int. Cl.
  *G06F 3/042* (2006.01)
  *G06F 3/0481* (2013.01)
  *G06F 3/0346* (2013.01)

(52) U.S. Cl.
  CPC ........ *G06F 3/04815* (2013.01); *G06F 3/0346* (2013.01); *G06F 3/0425* (2013.01)

(58) Field of Classification Search
  None
  See application file for complete search history.

(56) References Cited

U.S. PATENT DOCUMENTS

| | | |
|---|---|---|
| 2005/0177054 A1 | 8/2005 | Yi et al. |
| 2007/0171194 A1 | 7/2007 | Conti et al. |
| 2007/0211023 A1 | 9/2007 | Boillot |
| 2009/0002327 A1 | 1/2009 | Wilson et al. |
| 2012/0113140 A1 | 5/2012 | Hilliges et al. |
| 2012/0249531 A1 | 10/2012 | Jonsson |
| 2012/0306924 A1 | 12/2012 | Willoughby et al. |
| 2012/0308077 A1* | 12/2012 | Tseng ..................... G06Q 50/01 382/103 |
| 2013/0002591 A1 | 1/2013 | Whytock et al. |

(Continued)

FOREIGN PATENT DOCUMENTS

WO 2014012714 A1 1/2014

OTHER PUBLICATIONS

Sasakura, M.; Kotaki, A.; Inada, J. "A 3D molecular visualization system with mobile devices", 15th International Conference on Information Visualisation (IV 2011); Los Alamitos, CA.; IEEE Computer Society 2011.

*Primary Examiner* — Ilana Spar
*Assistant Examiner* — Kirk Hermann
(74) *Attorney, Agent, or Firm* — Patterson + Sheridan, LLP

(57) ABSTRACT

The disclosure provides an approach for populating a virtual environment with objects. In one embodiment, an editing application may track a handheld device using sensor data from a camera, by following an image displayed on the handheld device's screen. The editing application then updates the position of an object in the virtual environment according to the tracked position of the handheld device. Initially, the handheld device may be placed at a fixed location for calibration purposes, during which the editing application initializes a mapping between the virtual and physical environments. To add an object to the virtual environment, a user may select the object on the handheld device. The user may then place the object at a desired location and orientation in the virtual environment by moving the handheld device in the physical environment.

15 Claims, 3 Drawing Sheets

(56) References Cited

U.S. PATENT DOCUMENTS

| | | | |
|---|---|---|---|
| 2013/0016102 A1 | 1/2013 | Look et al. | |
| 2013/0307875 A1* | 11/2013 | Anderson | G06T 19/006 345/633 |
| 2013/0328762 A1* | 12/2013 | McCulloch | G02B 27/017 345/156 |
| 2014/0104156 A1 | 4/2014 | Touma et al. | |
| 2014/0282220 A1* | 9/2014 | Wantland | G06F 3/04845 715/782 |
| 2015/0316985 A1* | 11/2015 | Levesque | G06T 19/006 345/156 |

\* cited by examiner

HAPTIC INTERFACE FOR POPULATION OF A THREE-DIMENSIONAL VIRTUAL ENVIRONMENT

BACKGROUND

Field

This disclosure provides techniques for interacting with virtual environments. More specifically, embodiments of this disclosure present a haptic interface for populating three-dimensional virtual environments.

Description of the Related Art

Experts typically manipulate objects in three-dimensional (3D) virtual environments using mouse gestures and keyboard commands, while working in different editing modes such as translation, rotation, scaling, and the like. For example, to move an object in the commercially available Maya® program, a user may move the view of a particular camera (orthographic or perspective), zoom in on the object, and translate the object within the camera view. While adequate for professionals, this form of 3D object manipulation is often difficult to learn and unsuitable for casual users and children, particularly as users are required to understand a non-trivial mapping between the space where the physical device is manipulated and the space of the virtual environment.

Simplified solutions have been proposed to facilitate 3D object manipulation by casual users and children. By limiting the user's choices, such as by forcing predefined positions or orientations, it is possible to simplify the 3D object manipulation process. However, such approaches can limit the expressiveness and depth of what is produced.

SUMMARY

One embodiment of this disclosure provides a computer implemented method for populating a virtual environment. The method generally includes receiving, from a handheld device, a selection of an object to add to the virtual environment. The method further includes tracking a position of the handheld device and updating a position of the object in the virtual environment based on the tracked position of the handheld device.

Other embodiments include, without limitation, a computer-readable medium that includes instructions that enable a processing unit to implement one or more aspects of the disclosed method as well as a system configured to implement one or more aspects of the disclosed method.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
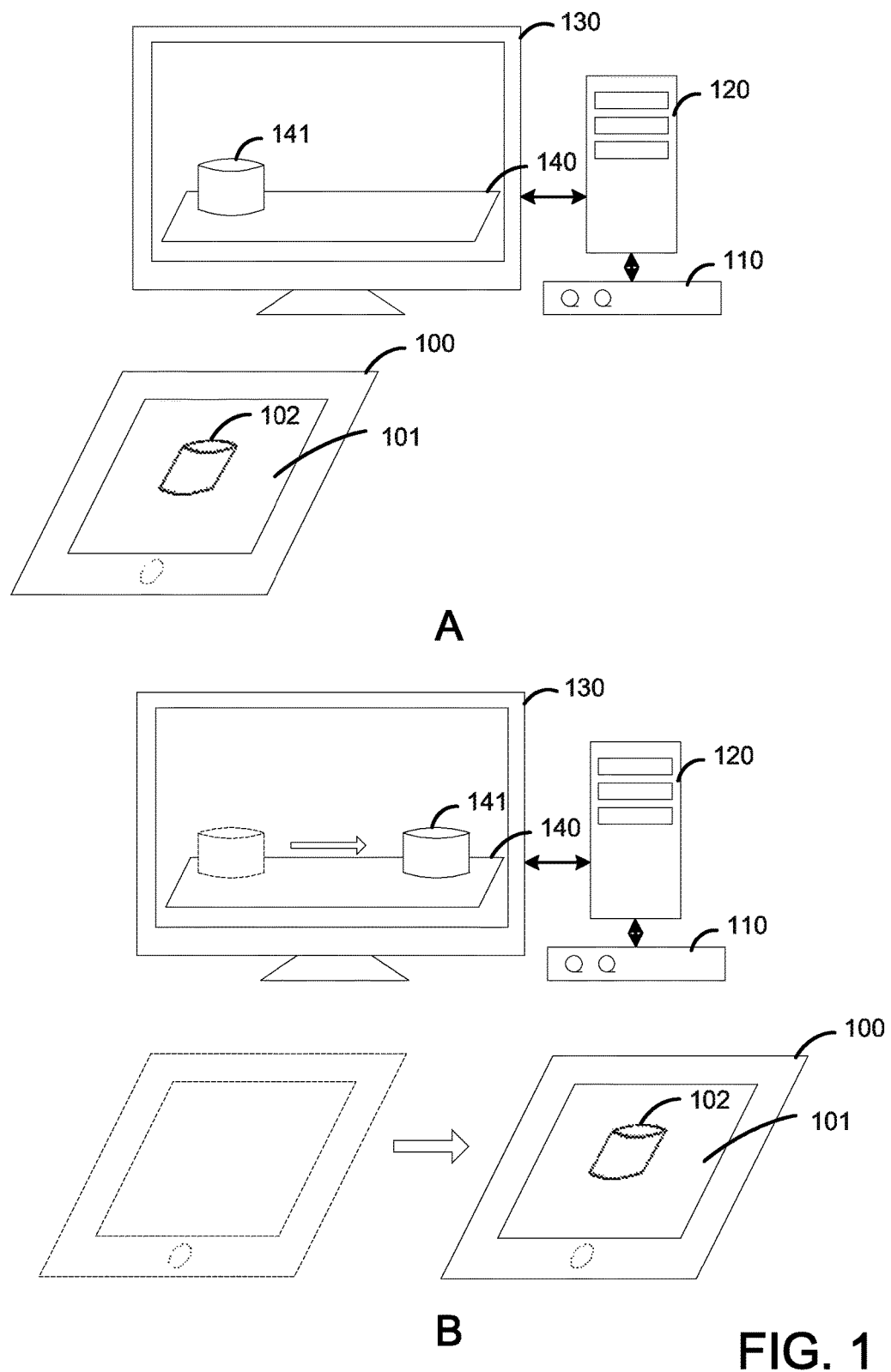
FIG. 1 illustrates an example of manipulating an object in a three-dimensional virtual environment, according to an embodiment.

This disclosure provides techniques for populating a virtual environment with objects. In one embodiment, a three-dimensional (3D) virtual environment editing application tracks movement of a handheld device in physical space. Based on the movement, the editing application updates a position of an object in a 3D virtual environment. As used herein, "position" refers to both location (e.g., (x, y, z) coordinates) and orientation. In one embodiment, the editing application may track the handheld device using sensor data from a camera, by locking onto and following an image displayed on the handheld device's screen includes using computer vision algorithms which compute the position of the handheld device based on the displayed image. In alternative embodiments, other sensor data may be used. For example, the editing application may track near infrared (IR) markers positioned on the handheld device using sensor data from an IR camera. As another example, sensors (e.g., an accelerometer, gyroscope, magnetometer, etc.) in the handheld device itself may detect changes in location and orientation of the handheld device, and the handheld device may communicate such changes to the editing application.

Initially, the handheld device may be placed at a fixed location for calibration purposes, during which the editing application may locate the device in the physical environment and initialize a mapping between the virtual and physical environments. To add an object to the 3D virtual environment, a user may select the object on the handheld device, after which the handheld device communicates the selection to the editing application. The user may further use gesture inputs on the device to scale and otherwise modify the selected object, and the handheld device similarly communicates these modifications to the editing application. The editing application then adds 3D geometry for the object at an initial location within the virtual environment, after which the user can re-position the object by moving the handheld device in the physical environment. As discussed, the editing application tracks the handheld device using sensor data from, e.g., a red-green-blue (RGB) or an IR camera used to track an image displayed on the handheld device or near IR markers on the handheld device, respectively, and/or sensor data from sensors located in the handheld device itself. In turn, the editing application updates the location and orientation of the object in the virtual environment based on the position of the handheld device in the physical environment and the mapping between the virtual and physical environments. As a result, the user can manipulate the object in the 3D virtual environment with movements of the handheld device, as if the object were being moved in physical space. The user may place the object at a desired location and orientation in, e.g., a video game level, architectural or product design, or the like. One advantage of this approach is that the handheld device may be moved on a surface, and the friction from such movement may permit precise placement of objects.

FIG. 1 illustrates an example of manipulating an object in a three-dimensional environment, according to an embodiment. As shown in panel A, a handheld device 100 communicates a selection of an object 102 to a console device 120. In this example, handheld device 100 is presumed to be a tablet computer. Of course, other embodiments may be adapted for use with a variety of computing devices, including mobile phones, personal digital assistants (PDAs), video game devices, wearable devices, and other computing devices having display screens.

In one embodiment, the handheld device 100 may run a selected application which permits a user to make selections of objects to add to a 3D virtual environment 140 and to make various modifications to the objects, such as scaling the objects. Illustratively, the handheld device 100 includes a touch sensitive display 101. Users may make touch-based gestures on touch sensitive display 101 to select objects to add to the 3D virtual environment 140 and to modify the objects. For example, the selection application may permit users to make a swiping gesture to scroll through objects, pinch to scale a selected object, and the like. The selection application may transmit a signal communicating the selected object or modification to a 3D virtual environment editing application running in the console device 120. Such communication may be via, e.g., a wireless network and may use any feasible communication protocol, such as WiFi or Bluetooth. Alternatively, the selection communication may be via a camera which captures an image displayed on the display 101 of the handheld device 100 (e.g., an image of the selected or modified object), rather than requiring WiFi or a separate communication channel.

The console device 120 may be a computer system or video game console executing the editing application and sending a video signal to a display 130 for displaying a rendering of the 3D virtual environment 140, including objects (e.g., object 141) added to the virtual environment 140. As discussed, console device 120 communicates with the handheld device 100 regarding objects that are selected for addition to the virtual environment 140 and modifications to those objects. In addition, console device 120 communications with a sensor device 110, which provides camera and/or other sensory inputs to console device 120. In one embodiment, the sensor device 110 may include an RGB camera that captures visible light. In another embodiment, the sensor device 110 may include an infrared camera that captures infrared light. In yet another embodiment, the sensor device 110 may include one or more sensors for capturing depth information. In a particular embodiment, the sensor device 110 may be a Microsoft Kinect® or similar device.

In operation, the editing application running in the console device 120 receives selections and modifications to objects via the handheld device 100, as well as sensor data from the sensor device 110 and/or the handheld device 100 itself. The editing application may be configured to track movement of the handheld device 100 based on the sensor data. In response, the editing application repositions the selected object in the 3D virtual environment 140 according to the movement of the handheld device 100. Note, although the editing application is discussed herein primarily as an application running in the console device 120, operations described as being performed by the editing application may instead be performed by another component. For example, the sensor device 110 may include an application that tracks movement of the handheld device 100, and in such a case, the editing application running in the console 120 may communicate what to track to the tracking application running in the sensor device, which communicates the results of the tracking back to the editing application.

In one embodiment, the editing application may receive data captured by an RGB camera in the sensor device 110 and, in such a case, the editing application may track movement of the handheld device 100 by identifying an image displayed on the display screen 101 of the handheld device 100 during a calibration phase. Once discovered, the console 120 tracks changes in the position of that image on the display screen of the handheld device 100. For example, the editing application may lock onto and follow an image of the selected object 102 displayed on the display screen 101 using computer vision algorithms which compute the position of the handheld device based on the image displayed on the display screen. As the object 102 that is selected is communicated to the editing application, the editing application is aware of the selected object 102 and may track the image of the selected object 102 displayed on the display screen 101. Alternatively, the editing application may track a single predefined image, such as a generic image, as opposed to the image of the selected object 102. Well-known techniques may be adapted to determine location and orientation of the tracked image in space based on, among other things, the shape and size of the displayed image as it appears in the image or video captured by the RGB camera. Location and orientation of the handheld device 100 may be inferred from this result. In embodiments where the editing application tracks a single predefined image, an application running in the handheld device 100 may, either automatically or in response to manual input, cause the display screen 101 to display the predefined image when the handheld device 100 is moved.

In other embodiments, the editing application may track movement of the handheld device 100 using other sensor data. For example, near IR markers such as light emitting diodes (LEDs) may be placed on the handheld device 100, and the sensor device 110 may include an IR camera which captures IR radiation, particularly IR radiation emitted by the IR markers. In such a case, the editing application may receive IR radiation data from the sensor device 110 and track the IR markers to determine location and orientation of the handheld device 100. As another example, the handheld device 100 may include sensors (e.g., an accelerometer, gyroscope, magnetometer, etc.) which detect changes in location and orientation of the handheld device and communicate such changes to the editing application.

After determining the location and orientation of the handheld device 100, the editing application may relocate and/or reposition the object 141 in the 3D virtual environment 140, based on the location and orientation of the handheld device 100. For example, panel B shows the handheld device 100 being moved to the right. In response to this movement, the object 141 on the display 130 is moved to the right in the 3D virtual environment 140 by a corresponding amount. As discussed in greater detail below, the amount by which the object 141 moves in the virtual environment in response to movement of the handheld device 100 may be determined using a mapping between the physical and virtual environments. And the mapping is obtained during a calibration phase in which the handheld device 100 is positioned at a fixed location. As the full 3D position of the handheld device 100 in space can be recovered, the object 141 may generally be moved to any location and orientation in the 3D virtual environment. In one embodiment, the object 141 may be snapped to a plane or other surface in the 3D virtual environment so that, e.g., buildings are placed on terrains rather than in the air.

In another embodiment, the editing application may generate an augmented reality (AR) image or video using the determined location and orientation of the handheld device 100. As used herein, augmented reality generally refers to enhancing an image or video with computer-generated input. For example, the editing application may receive an image or video of the physical room or area in which the user with the handheld device 100 is located, as well as depth information for the room or area. Depth information may be captured using one or more sensors. For example, the commercially available Kinect® uses an infrared projector in conjunction with a monochrome CMOS (complimentary metal-oxide semiconductor) sensor to capture depth information. Using the determined location and orientation of the handheld device 100 and the depth information, the editing application may overlay an object (e.g., the selected object 102) on the image or video so that object appears in the image or video and has location and orientation corresponding to the handheld device 100.

Figure 2:
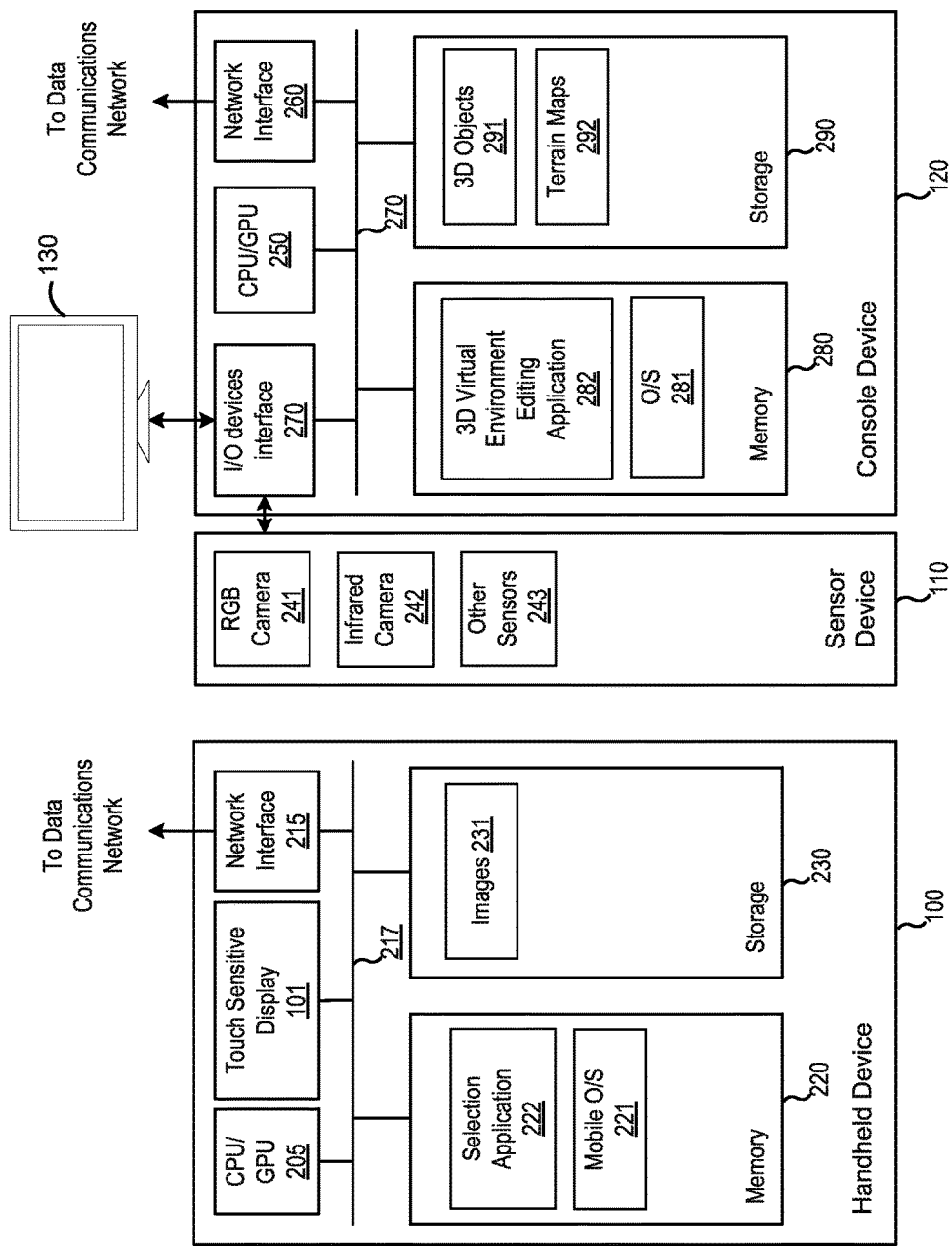
FIG. 2 illustrates a system in which an embodiment of this disclosure may be implemented.

FIG. 2 illustrates a system 200 in which an aspect of this disclosure may be implemented. As shown, the system 200 includes the handheld device 100, the sensor device 110, the console device 120, and the display 130, discussed above. Illustratively, the handheld device 100 includes, without limitation, a central processing unit (CPU) or graphics processing unit (GPU) 205, a touch sensitive display 101, a network interface 215 connecting the system to a network, an interconnect 217, a memory 220, and storage 230. As discussed, the handheld device 100 may be a tablet computer, a mobile phone, a PDA, a video game device, a wearable device, and the like.

The CPU/GPU 205 retrieves and executes programming instructions stored in the memory 220. The interconnect 217 facilitates transmission, such as of programming instructions and application data, between the CPU/GPU 205, touch sensitive display 101, storage 230, network interface 215, and memory 220. CPU/GPU 205 is included to be representative of a single CPU/GPU, multiple CPUs/GPU, a single CPU/GPU having multiple processing cores, and the like. And the memory 220 is generally included to be representative of a random access memory. The storage 230 may be a disk drive storage device. Although shown as a single unit, the storage 230 may be a combination of fixed and/or removable storage devices, such as magnetic disk drives, flash drives, removable memory cards or optical storage, network attached storage (NAS), or a storage area-network (SAN). Further, handheld device 100 is included to be representative of a physical computing system as well as virtual machine instances hosted on a set of underlying physical computing systems. Further still, although shown as a single computing system, one of ordinary skill in the art will recognized that the components of the handheld device 100 shown in FIG. 2 may be distributed across multiple computing systems connected by a data communications network.

As shown, the memory 220 includes an operating system 221 and a selection application 222. The operating system 221 may be any mobile operating system, such as Android®. The selection application 222 is configured to receive selections of objects and modifications to objects made using, e.g., touch-based gestures on the display 21, and to display images 231 of the object themselves and/or other images. Further the selection application 222 may communicate the selected objects and modifications to a 3D virtual environment editing application 310 running in the console device 120.

As shown, the console device 120 also includes a CPU/GPU 250, a network interface 260, an interconnect 270, a memory 280, and a storage 290, which are similar to the CPU/GPU 205, network interface 215, interconnect 217, memory 225, and data storage 230 discussed above and descriptions of which will not be repeated for conciseness. The console device 120 is in communication with both the handheld device 100 and the sensor device 110. In particular, a 3D virtual environment editing application 282 running in the console device 120 is configured to receive selections of objects and modifications thereto, as well as sensor data from one or more sensors (the RGB camera 241, IR camera 242, or other sensors 243) in the sensor device 110. In turn, the editing application 282 is configured to detect movement of the handheld device 100, by locking onto and following an image displayed on the touch based display 210 of the handheld device 100, near IR markers placed on the handheld device 100, or the like. The editing application 282 is further configured to update a position of the selected object (or objects) based on the detected movement. In another embodiment, the editing application 282 may be configured to generate an AR image or video which overlays object(s) onto an RGB image or video based on the detected location and orientation of the handheld device and a depth map associated with the ordinary image or video.

Figure 3:
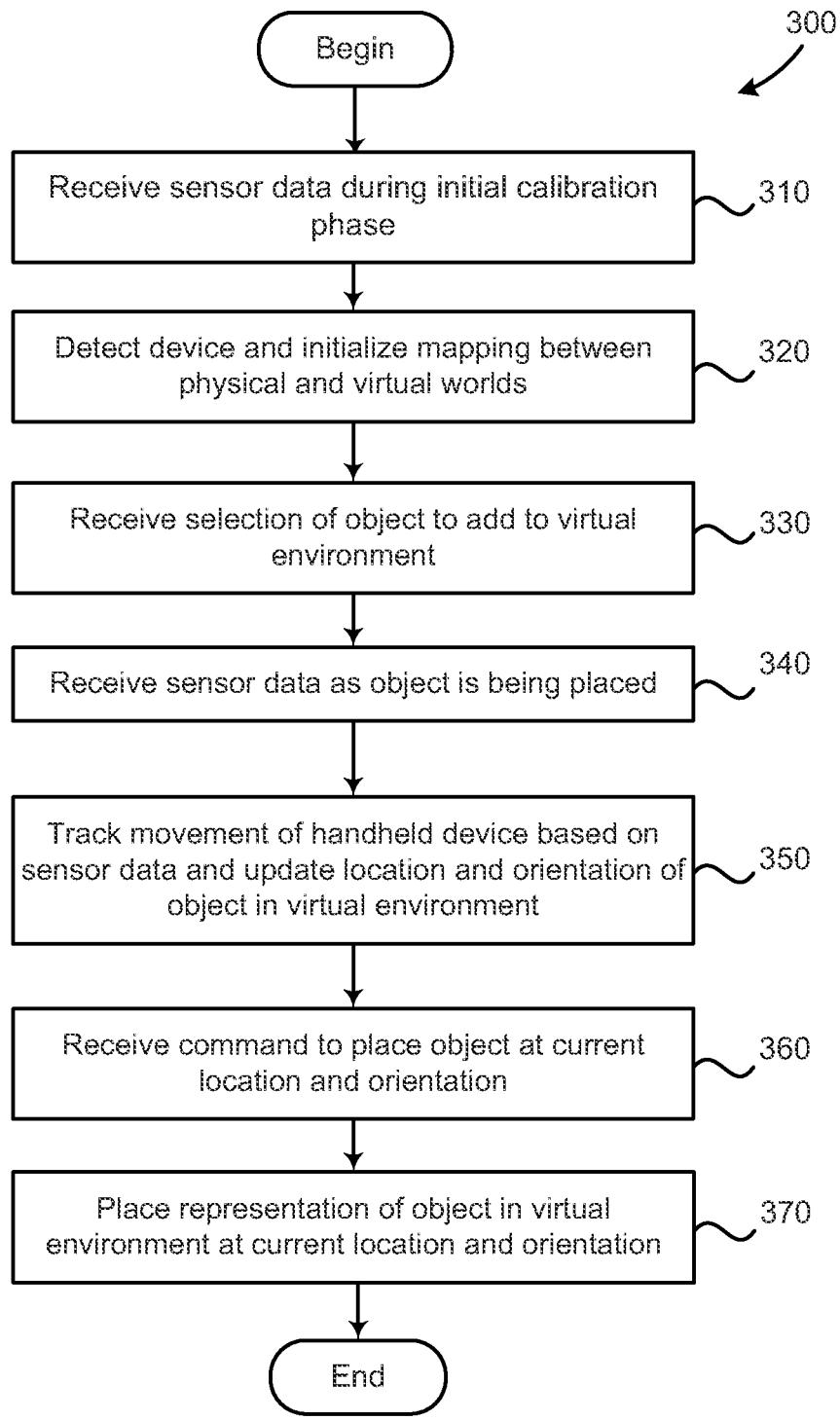
FIG. 3 illustrates a method for populating a virtual environment with objects, according to an embodiment.

FIG. 3 illustrates a method 300 for populating a virtual environment with objects, according to an embodiment. As shown, the method 300 begins at step 310, where the editing application receives sensor data during an initial calibration phase. During this phase, a user may place the handheld device at a fixed location. A sensor, such as an RGB or IR camera, then captures visible or IR light in its view, respectively, including light from the handheld device.

At step 320, the editing application initializes a mapping between the physical and virtual environment. That is, using the sensor data received at step 310, the editing application determines a transformation between a coordinate system of the physical space and the virtual environment space. The transformation, or mapping, may then be used to determine the size and orientation of movement in the virtual environment that is to be made in response to a corresponding movement of the handheld device in the physical space.

At step 330, the editing application receives a selection of an object to add to the virtual environment. In one embodiment, the selection of the object to add is made on the handheld device using touch-based gestures on a display screen of the handheld device. The handheld device communicates such a selection to a console on which the editing application runs via a wireless network, or by any other feasible means, such as via an image of the object displayed on the handheld device that is captured by a camera and transmitted to the editing application. In addition to selecting the object itself, the user may also be permitted to scale or otherwise modify the object (e.g., changing a color or rendering property of the object). Touch-based gestures (e.g., pinching to scale) may also be provided for selecting such modifications, and the handheld device may communicate modification selections to the console by the same means.

At step 340, the editing application receives sensor data as the object is being placed. Similar to the calibration phase, the sensor data may include visible or infrared light data captured by an RGB or infrared camera, respectively. In one embodiment, the sensor data may also include data from one or more sensors configured to capture depth information for generating depth maps of the physical environment. As discussed, the commercially available Kinect® uses an infrared projector in conjunction with a monochrome CMOS sensor to capture depth information.

At step 350, the editing application tracks movement of the handheld device based on the received sensor data. In response, the editing application updates location and orientation of the object in the virtual environment. In one embodiment, the sensor data may include visible light data, and the editing application may track the movement of an image displayed on the screen of the handheld device. Such tracking may include using computer vision algorithms to compute the location and orientation of the handheld device based on the image displayed on the screen. Well-known techniques may be adapted to determine location and orientation of the tracked image in space based on, e.g., the shape and size of the displayed image as it appears in the image or video captured by the RGB camera.

In one embodiment, the image displayed on the handheld device may be a single, predefined image that is always used for tracking movement of the handheld device. In such a case, the handheld device may switch to that image when the handheld device is moved to reposition the object in the 3D virtual environment. Alternatively, more than one image may be used to track movement of the handheld device. For example, the editing application may track an image depicting the object being added that is displayed on the display screen of the handheld device. In such a case, the image that is tracked may change as the selected object changes, and the handheld device may communicate the image to track to the editing application (if the editing application is not already aware of the image).

In alternative embodiments, other sensor data, e.g., data for captured IR radiation emitted by IR markers on the handheld device or data captured by sensors in the handheld device itself, may be used to track movement of the handheld device. In such a case, the editing application may, e.g., track movement of the IR markers using computer vision algorithms or use captured data from the sensors in the handheld device to determine location and orientation of the handheld device.

At step 360, the editing application receives a command to place the object at a current location and orientation. When the user has positioned the object at a desired location and orientation in the 3D space, the user may indicate to place the object in the 3D environment at that position (e.g., by pressing a key or via a touch-based gesture). In turn, the handheld device may transmit a signal to place the object at the current position to the console device. Responsive to such a signal, the editing application places the object in the virtual environment at the current location and orientation (step 370). As discussed, the object may generally be moved to any location and orientation in the 3D virtual environment by corresponding movements of the handheld device. In one embodiment, however, the editing application may snap the object to a plane or other surface in the 3D virtual environment so that, e.g., buildings are placed on terrains rather than in the air.

Advantageously, techniques disclosed herein provide an intuitive interface for users to add objects to virtual environments. An editing application creates a one-to-one mapping of a handheld device to its virtual counterpart, the object to be added. To move or rotate the object, the user can simply move or rotate the handheld device. This is a natural interaction and does not require the user to understand a non-trivial mapping between the space where the handheld device is located and the virtual space in the virtual environment, as required by previous techniques. Further, the handheld device may be moved on a surface, and the friction from such a movement permits precise placement of objects.

The preceding description references aspects of the disclosure. However, it should be understood that the disclosure is not limited to specific described aspects. Instead, any combination of the preceding features and elements, whether related to different aspects or not, is contemplated to implement and practice the disclosure. Furthermore, although aspects of the disclosure may achieve advantages over other possible solutions and/or over the prior art, whether or not a particular advantage is achieved by a given aspect is not limiting of the disclosure. Thus, the preceding aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A computer-implemented method for populating a virtual environment, comprising:
    receiving, from a handheld device, a selection of an object to add to the virtual environment;
    tracking a position of the handheld device, wherein tracking the position of the handheld device includes using one or more computer vision algorithms to compute the position of the handheld device based on either an image displayed on a screen of the handheld device, the image including a depiction of the object, or one or more near infrared (IR) markers positioned on the handheld device; and
    updating a position of the object in the virtual environment based on the tracked position of the handheld device.

2. The method of claim 1, wherein the image displayed on the screen of the handheld device further includes a predefined image used for tracking.

3. The method of claim 1, further comprising:
    modifying one or more characteristics of the object in the virtual environment in response to receiving a touch-based gesture on the screen of the handheld device.

4. The method of claim 1, further comprising:
    receiving a depth map of a physical environment in which the handheld device is located;
    receiving one or more images of the physical environment; and
    adding, to the one or more images of the physical environment, a depiction of the object based on the tracked position of the handheld device and the depth map of the physical environment.

5. The method of claim 1, wherein the handheld device is one of a mobile phone, a tablet computer, a laptop computer, a personal digital assistant (PDA), a video game device, and a wearable device.

6. The method of claim 1, further comprising:
    snapping the position of the object to a plane in the virtual environment.

7. A non-transitory computer-readable storage medium storing a program, which, when executed by a processor performs operations for populating a virtual environment, the operations comprising:
    receiving, from a handheld device, a selection of an object to add to the virtual environment;
    tracking a position of the handheld device, wherein tracking the position of the handheld device includes using one or more computer vision algorithms to compute the position of the handheld device based on either an image displayed on a screen of the handheld device, the image including a depiction of the object, or one or more near infrared (IR) markers positioned on the handheld device; and
    updating a position of the object in the virtual environment based on the tracked position of the handheld device.

8. The computer-readable storage medium of claim 7, wherein the image displayed on the screen of the handheld device further includes a predefined image used for tracking purposes.

9. The computer-readable storage medium of claim 7, the operations further comprising:
    modifying one or more characteristics of the object in the virtual environment in response to receiving a touch-based gesture on the screen of the handheld device.

10. The computer-readable storage medium of claim 7, the operations further comprising:
    receiving a depth map of a physical environment in which the handheld device is located;
    receiving one or more images of the physical environment; and
    adding, to the one or more images of the physical environment, a depiction of the object based on the tracked position of the handheld device and the depth map of the physical environment.

11. The computer-readable storage medium of claim 7, wherein the handheld device is one of a mobile phone, a tablet computer, a laptop computer, a personal digital assistant (PDA), a video game device, and a wearable device.

12. The computer-readable storage medium of claim 7, the operations further comprising:
    snapping the position of the object to a plane in the virtual environment.

13. A system, comprising:
    a processor; and
    a memory, wherein the memory includes an application program configured to perform operations for populating a virtual environment, the operations comprising:
    receiving, from a handheld device, a selection of an object to add to the virtual environment,
    tracking a position of the handheld device, wherein tracking the position of the handheld device includes using one or more computer vision algorithms to compute the position of the handheld device based on either an image displayed on a screen of the handheld device, the image including a depiction of the object, or one or more near infrared (IR) markers positioned on the handheld device, and
    updating a position of the object in the virtual environment based on the tracked position of the handheld device.

14. The system of claim 13, the operations further comprising:
    modifying one or more characteristics of the object in the virtual environment in response to receiving a touch-based gesture on the screen of the handheld device.

15. A computer-implemented method, comprising:
    receiving a depth map of a physical environment in which a handheld device is located;
    receiving one or more images of the physical environment;
    receiving, from the handheld device, a selection of an object to add to an augmented reality environment;
    tracking a location and orientation of the handheld device, wherein tracking the location and orientation of the handheld device includes using one or more computer vision algorithms to compute the location and orientation of the handheld device based on at least one of an image of the selected object displayed on a screen of the handheld device, a predefined image displayed on the screen of the handheld device, and one or more near infrared (IR) markers positioned on the handheld device;
    updating a location and orientation of the object in the augmented reality environment based on the tracked location and orientation of the handheld device and the depth map of the physical environment; and
    adding, to the one or more images of the physical environment, a depiction of the object based on the updated location and orientation of the object.

* * * * *